(12) United States Patent
Vishwakarma et al.

(10) Patent No.: US 11,928,091 B2
(45) Date of Patent: *Mar. 12, 2024

(54) STORING DIGITAL DATA IN STORAGE DEVICES USING SMART CONTRACT AND BLOCKCHAIN TECHNOLOGY

(71) Applicant: EMC IP Holding Company LLC, Hopkinton, MA (US)

(72) Inventors: Rahul Vishwakarma, Bangalore (IN); Bing Liu, Tianjin (CN); Parmeshwr Prasad, Bangalore (IN); Parminder Singh Sethi, Punjab (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/155,609

(22) Filed: Jan. 22, 2021

(65) Prior Publication Data
US 2022/0237156 A1    Jul. 28, 2022

(51) Int. Cl.
*G06F 16/00* (2019.01)
*G06F 11/14* (2006.01)
*G06F 16/215* (2019.01)
*G06F 16/22* (2019.01)
*G06F 16/25* (2019.01)
*G06F 21/64* (2013.01)

(52) U.S. Cl.
CPC ........ *G06F 16/215* (2019.01); *G06F 11/1453* (2013.01); *G06F 16/2237* (2019.01); *G06F 16/2255* (2019.01); *G06F 16/258* (2019.01); *G06F 21/64* (2013.01); *G06F 2201/805* (2013.01)

(58) Field of Classification Search
None
See application file for complete search history.

(56) References Cited

U.S. PATENT DOCUMENTS

| | | | | |
|---|---|---|---|---|
| 2020/0379856 | A1* | 12/2020 | Jayachandran | G06F 21/602 |
| 2020/0412525 | A1* | 12/2020 | Katsak | H04L 9/0637 |
| 2022/0027319 | A1* | 1/2022 | Narayanam | H04L 9/3239 |

OTHER PUBLICATIONS

Sharma, Pratima, Rajni Jindal, and Malaya Dutta Borah. "Blockchain technology for cloud storage: A systematic literature review." ACM Computing Surveys (CSUR) 53.4 (2020): 1-32. (Year: 2020).*

* cited by examiner

*Primary Examiner* — Bai D Vu
(74) *Attorney, Agent, or Firm* — Staniford Tomita LLP

(57) ABSTRACT

Embodiments include a method of storing digital data in a blockchain by receiving the digital data from a user, deduplicating the data in a deduplication system of the user to form deduplicated data, and encoding the deduplicated data into an array format for storage on a blockchain. A smart contract is deployed for deduplication on the destination side of the data, and the deduplicated data is encoded into a Binary Aligned Map (BAM) format for storage on the blockchain. A process on the destination side stores the deduplicated array data as a next block in the blockchain only if the next block agrees with the smart contract, and the blockchain is stored in system storage comprising hard disk, solid state, tape, or optical devices.

15 Claims, 10 Drawing Sheets

STORING DIGITAL DATA IN STORAGE DEVICES USING SMART CONTRACT AND BLOCKCHAIN TECHNOLOGY

TECHNICAL FIELD

Embodiments are generally directed to data storage networks, and more specifically to storing data in a blockchain using smart contracts.

BACKGROUND

Large-scale data storage networks process an overwhelming amount of data. Securing this data against exposure, corruption, and theft is a critical task of system administrators and software vendors. Although modern networks can store data in different locations and target storage media, much of the main processes and storage devices are centralized around a common storage platform. This provides centralized control, but also presents a central point of vulnerability. Despite the presence of diligent backup efforts, such data is also vulnerable to potential loss through accidental or catastrophic events, or even natural degradation of storage media.

Blockchain technology has often been proposed as a solution to the problems inherent with centralized systems. As is well-known, a blockchain is a shared immutable ledger for recording a series of transactions. It may be used in a business application to provide a permissioned network with known identities, such as to provide secure exchanges through an escrow-like mechanism. Technically, a blockchain is a digital ledger of records arranged in a series of blocks (data chunks) that are linked with one another through a cryptographic validation (i.e., hashing function). When linked, the blocks form an unbroken blockchain.

Present data storage systems do not exploit the benefits of blockchain technology to provide decentralized and immutable storage of critical digital data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
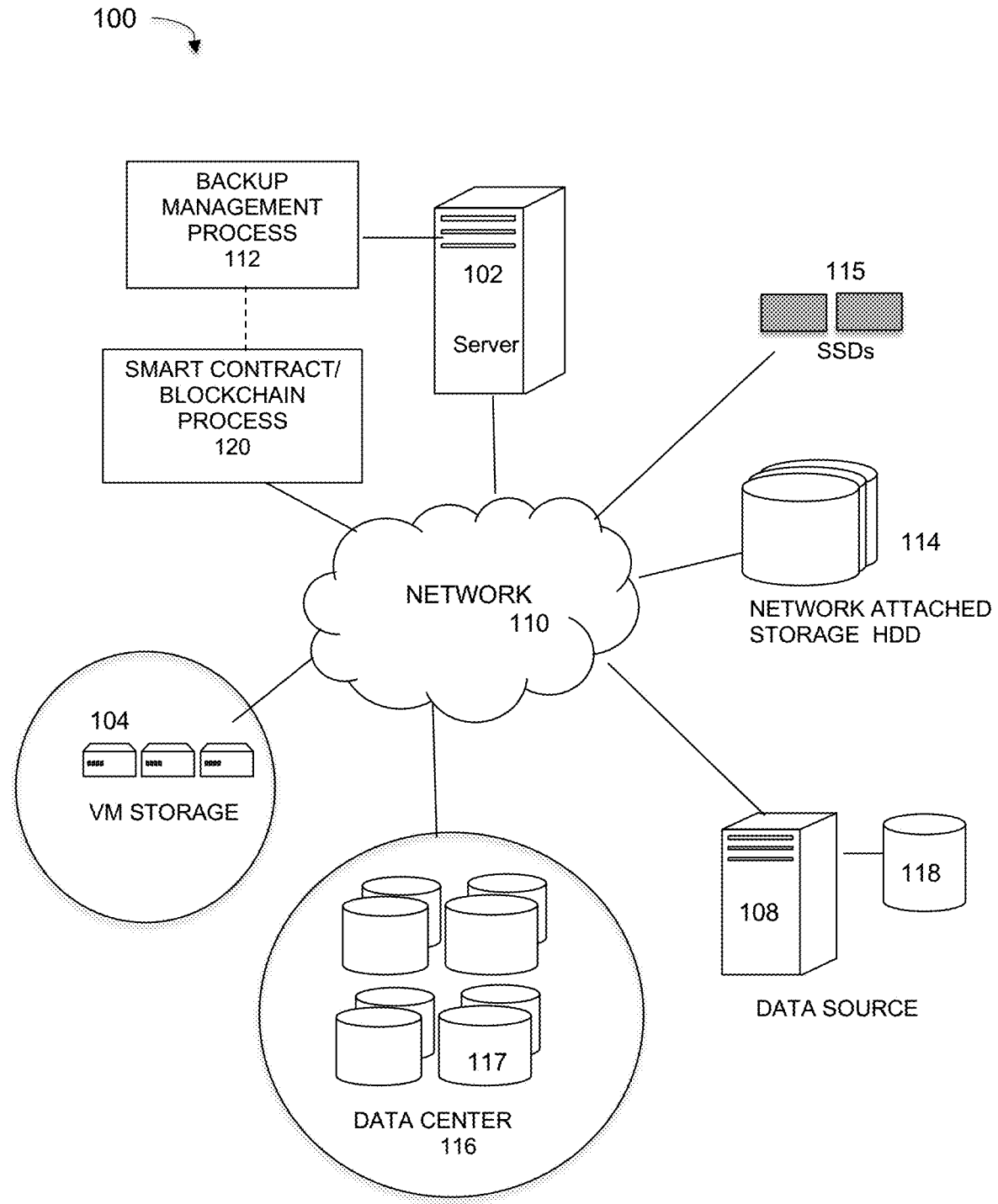
FIG. 1 illustrates an enterprise-scale network system with devices that implement one or more embodiments of a data protection system using a blockchain and smart contract technology, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard-coded in hardware or take the form of software executing on a general-purpose computer or be hardwired or hard-coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Some embodiments of the invention involve large-scale IT networks or distributed systems (also referred to as "environments"), such as a cloud based network system or very large-scale wide area network (WAN), or metropolitan area network (MAN). However, those skilled in the art will appreciate that embodiments are not so limited, and may include smaller-scale networks, such as LANs (local area networks). Thus, aspects of the one or more embodiments described herein may be implemented on one or more computers in any appropriate scale of network environment, and executing software instructions, and the computers may be networked in a client-server arrangement or similar distributed computer network.

Embodiments are directed to systems and methods for providing decentralized and immutable storage of digital data by storing data on storage devices using blockchain and smart contract technology. Embodiments provide features such as the use of trusted storage and random access of data, decentralized storage of immutable metadata in a blockchain, and the use of a smart contract for similarity-based data deduplication. The random access element is implemented through a key-value pair for locality similarity hashing (LSH). Similarity based variable length deduplication on the storage side further reduces redundancies of stored data blocks, and storing metadata in a blockchain makes the data immutable and tamper proof thereby eliminating the single point of failure.

FIG. 1 illustrates a data storage system 100 that implements one or more embodiments of a blockchain and smart contract based data storage system, under some embodiments. In system 100, a backup or storage server 102 executes a backup management process 112 that coordinates or manages the backup of data from one or more data sources 108 (e.g., clients) to various storage devices. The storage devices may serve as network storage devices or target storage devices for data backed up in large-scale data backup operations. The storage devices may be network attached storage provided as hard disk drive (HDD) devices 114 and/or solid state devices (SSD) 115. The storage devices may be coupled to server 102 through network 110 or a Fibre Channel (FC) link, Virtual Machine (VM) storage 104, or local client storage. Disk drives 117 may also form parts of one or more data centers 116. The storage devices may also be implemented as tape drives, optical drives, or any other similar storage device.

Depending on the scale of network 100, any number of disk drives (e.g., HDD or SDD devices) may be used for storage of the data generated or sourced by the system. The storage server 102 executes a backup process 112 that causes or facilitates the backup of the application data the storage devices of the network, which may at least be partially implemented through RAID components of array or any of the disk drives in the system. The storage server 108 may implement certain backup processes such as deduplication processes. In an embodiment the storage server is embodied as a data domain replicator (DDR) device provided by EMC Corporation of Hopkinton, Massachusetts.

Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application; and the network may include one or more virtual machines (VMs) 104 with each VM representing virtual clients that may be supported by one or more servers within each VM, or other type of centralized network server.

The data sourced in network 100 (e.g., data source 108) may be any appropriate data, such as database data that is part of a database management system. In this case, the data may reside on one or more hard drives (e.g., 118 or 114) and may be stored in the database in a variety of formats. One example is an Extensible Markup Language (XML) database, which is a data persistence software system that allows data to be stored in XML format. Another example is a relational database management system (RDMS) which uses tables to store the information.

In an embodiment, system 100 may represent a Data Domain Restorer (DDR)-based deduplication storage system, and storage server 128 may be implemented as a DDR Deduplication Storage server provided by EMC Corporation, though embodiments are not so limited and other similar backup and storage systems are also possible. In general, Data Domain is a purpose-built backup appliance providing streaming deduplication that is able to ingest data at full network speeds, from multiple backup sources while providing storage efficiency. Metadata is stored on a physical cloud tier within the Data Domain to facilitate ease of file lookup and recall.

The Data Domain File System (DDFS) is an inline data deduplication file system. implements single-instance storage techniques to eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data.

Although embodiments are described and illustrated with respect to certain example implementations, platforms, and applications, it should be noted that embodiments are not so limited, and any appropriate network supporting or executing any application may utilize aspects of the root cause analysis process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

Blockchain and Smart Contracts

FIG. 1 illustrates a data protection system that implements certain blockchain and smart contract technology processes 120, under some embodiments. In an embodiment, certain information for the data being backed up (e.g., deduplicated data) is stored in a blockchain. In general, a blockchain can include a history of data, messages, or transactions in a series of blocks where each block contains a mathematical summary, called a hash, of the previous block. This creates a blockchain where any changes made to a block will change that block's hash, which must be recomputed and stored in the next block. This changes the hash of the next block, which must also be recomputed and so on until the end of the chain. In the illustrated example, Block 0 has a hash "0x3a34ad . . . 55." The next Block 1 includes the hash "0xf6e1da2 . . . deb" and the previous (Block 0) hash "0x3a34ad . . . 55." The following Block 2 includes the hash "0x9327eb1b . . . 36a21" and the previous block's hash "0xf6e1da2 . . . deb."

The hash is based on a mathematical function that is not reversible and system users cannot predict what input can be used to produce the desired output. A valid hash can be found by repeatedly adjusting a changeable value in the block, which is known as a "nonce." The nonce can be adjusted and the hash can be recalculated until a valid hash is found that meets the validity requirements. The unpredictable nature of the hash considerably increases the difficulty of finding a nonce that produces a valid hash of the block. Typically, trillions of different nonce values may be tried before a valid hash is found. Therefore, changing the value of previously stored data in the blockchain can require a substantial amount of computational effort, although not impossible. The security of the blockchain is further enhanced by storing the blockchain data on a distributed network. A large number of users can have access to the blockchain network and miner nodes can be continuously attempting to add blocks to the end of the blockchain by finding a nonce that produces a valid hash for a given block of data.

Blockchains can be used with various types of transactions. For example, a transaction can use identity tokens for physical or digital assets. The identity tokens can be generated using a cryptographic hash of information that uniquely identifies the asset. The tokens can also have an owner that uses an additional public/private key pair. The owner of a public key can be set as the token owner identity and when performing actions against tokens, ownership proof can be established by providing a signature generated by the owner private key and validated against the public key listed as the owner of the token. The identity token for an entity may be the public key of a public/private key pair, where the private key is held by the entity. The creation of an identity token for an asset in a blockchain can establish a provenance of the asset, and the identity token can be used in transactions of the asset stored in a blockchain, creating a full audit trail of the transactions.

To record a simple transaction in a blockchain, each party and asset involved with the transaction needs an account that is identified by a digital token. For an asset transfer, for example, a current owner and next owner create accounts, and the current owner also creates an account that is uniquely identified by an asset identification number. The account for the asset identifies the current owner. The current asset owner creates a transaction against the account for the asset that indicates: 1) the transaction is a transfer of ownership, 2) the public keys (i.e., identity tokens) of the current owner and the next owner, 3) the identity token of the physical asset, and 4) the transaction is signed by the private key of the current owner. The current owner of the asset can create a transaction request that includes the transaction information on a user interface of a computing device. The transaction request can be broadcast to the blockchain network. If the blockchain network of nodes does not validate the transaction, the transaction is stopped and the transfer of ownership is not recorded. If the blockchain network of nodes validates and verifies the transaction, the transaction is combined with other transactions occurring at the same time to form data for a new block and the new block is added to the blockchain. The recorded transaction in the blockchain is evidence that the next owner identified in the transaction request is now the current owner.

To enable more complex transactions, a blockchain system can use "smart contracts" which is computer code that implements transactions of a contract. The computer code may be executed in a secure platform that supports recording transactions in blockchains. In addition, the smart contract itself can be recorded as a transaction in the blockchain using an identity token that is a hash of the computer code so that the computer code that is executed can be authenticated. When deployed, a constructor of the smart contract executes initializing the smart contract and its state. The state of a smart contract is stored persistently in the blockchain. When a transaction is recorded against a smart contract, a message is sent to the smart contract and the computer code of the smart contract executes to implement the transaction. The computer code ensures that all the terms of the contract are complied with before the transaction is recorded in the blockchain. For example, a smart contract may support the sale of an asset. The inputs to a smart contract to sell the asset may be the identity tokens of the seller, the buyer, and the asset and the sale price. The computer code ensures that the seller is the current owner of the asset and that the buyer has sufficient funds in their account. The computer code then records a transaction that transfers the ownership of the asset to the buyer and a transaction that transfers the sale price from the buyer's account to the seller's account. If either transaction is not successful, neither transaction is recorded in the blockchain.

When a message is sent to a smart contract to record a transaction, the message is sent to each node that maintains a replica of the blockchain. Each node can execute the computer code of the smart contract to implement the transaction. For example, if all nodes each maintain a replica of a blockchain, then the computer code is executed at each of the nodes. When a node completes the execution of the computer code, the results of the transaction are recorded in the blockchain. The nodes can employ a consensus algorithm to decide on which transactions to record and which transactions to discard. A majority of the nodes must verify the transaction, in order for the transaction to be recorded on the blockchain. The execution of the computer code at each node helps ensure the authenticity of the blockchain.

Figure 2:
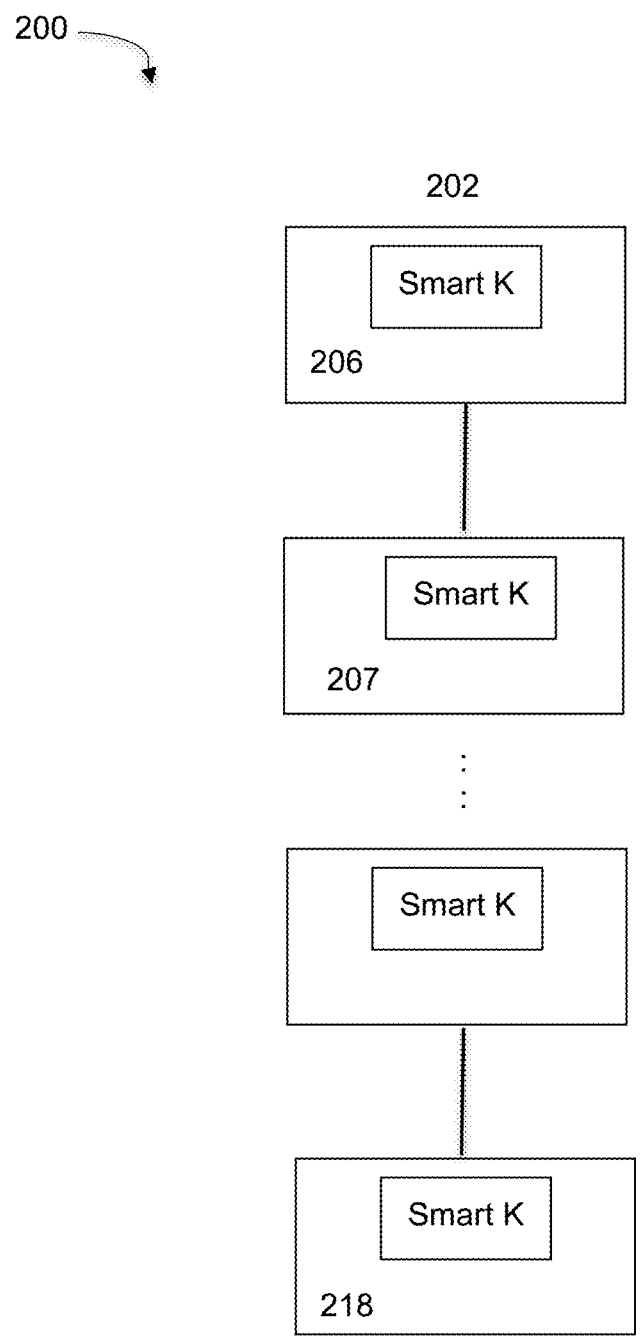
FIG. 2 is a diagram illustrating a general relationship of blockchain blocks and smart contracts, under some embodiments.

For the embodiment of FIG. 1, network 100 includes a component or process 120 that uses a smart contract to add deduplicated data blocks to a blockchain. FIG. 2 is a diagram illustrating a general relationship of blockchain blocks and smart contracts, under some embodiments. As shown in diagram 200, a blockchain 204 comprises a number of blocks beginning with block 206 and ending with block 218. Any practical number of intermediate blocks (e.g., 207) may be included. The initial block 206 contains a smart contract that is configured to help validate and generate a next block 207. In an embodiment, each block stores a data element representing data to be stored, where such data is typically generated using a deduplication backup process, such as 112 of FIG. 1. As new data is sent to be stored it is checked against a smart contract for storage as a new block, where each block size can be of a defined size or size range, such as on the order of 4 MB or less, although any other size is also possible. The block chain 202 thus forms a 'chain storage' of stored data that is validated by smart contracts and that is immutably stored on the blockchain.

Depending on implementation, the smart contract may be implemented as a single smart contract or a respective smart contract associated with each block to generate a next block in the blockchain. The blockchain itself may be a public or private blockchain.

Figure 3A:
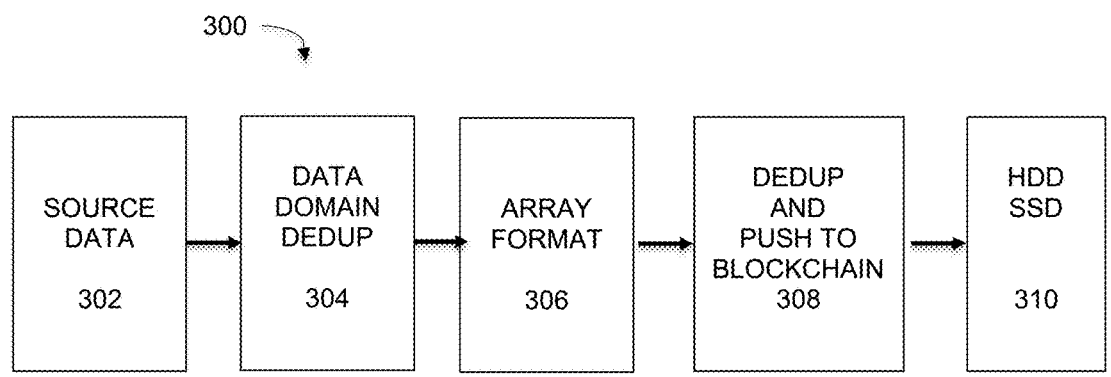
FIG. 3A is a block diagram illustrating a process of storing data on target storage using a blockchain, under some embodiments.

FIG. 3A is a block diagram illustrating a process of storing data on target storage using a blockchain, under some embodiments. System 300 of FIG. 3A processes source data, which can be any appropriate data sourced in system 100, such as documents, files, directories, database data, and in any appropriate format (text, images, etc.). A first part of the data storage process is deduplication, such as by a Data Domain system, 304. The deduplicated data is then converted to an array format, such as a BAM file, 306. The array data is deduplicated on the destination site which performs similarity-based deduplication of the encoded source data. This destination deduplicated data is pushed to a blockchain 308 and stored as subsequent block or blocks in the chain after verification by a smart contract for storage in HDD or SSD (or other) devices, 310.

Figure 3B:
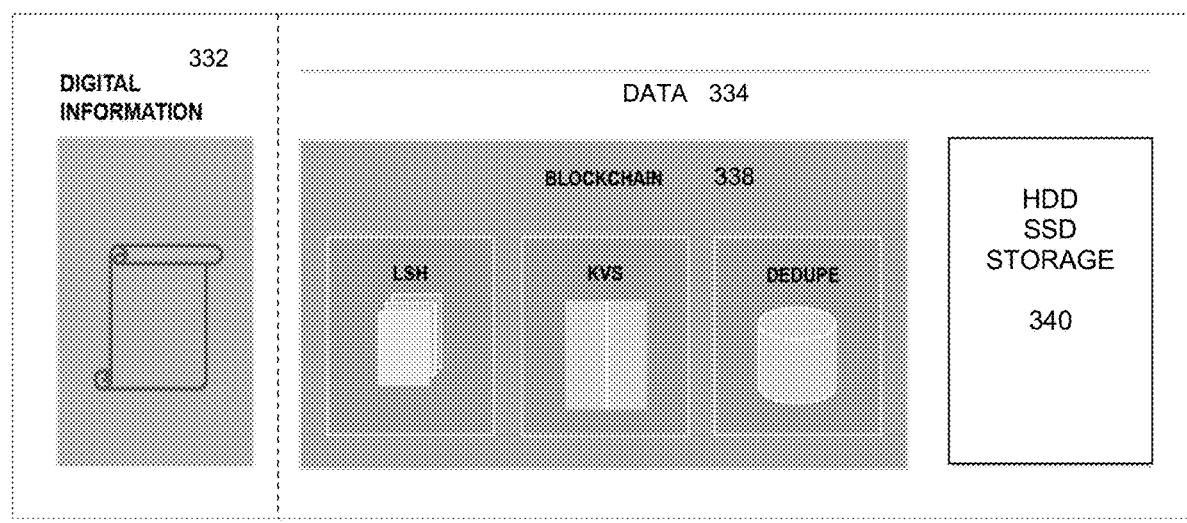
FIG. 3B illustrates a composition of digital data stored in a blockchain, under some embodiments.

FIG. 3B illustrates a composition of digital data stored in the blockchain, under some embodiments. As shown in FIG. 3B, the digital data 332 is stored as data 334 (including metadata). The encoded data 334 is pushed to blockchain 338 for performing similarity-based deduplication at the destination. A new block in blockchain will be created only based on the deduplication across all existing blocks of the blockchain. A smart contract is used for the deduplication. As shown in FIG. 3B, blockchain 338 stores data that has been processed using LSH, key-value stores (KVS) and deduplication processes. The blockchain data is then stored in HDD/SSD storage 340.

Some notable advantages of using a blockchain for data storage include data immutability in that once information is submitted to the blockchain it cannot be disrupted (i.e., blockchain is append-only storage; forever incremental), resistance to malicious tampering The blockchain also provides decentralization and thus higher levels of security over centralized server stores. Currently, most data storage uses centralized system; furthermore, these systems are highly susceptible to attacks. Thus, embodiments provide a new smart contract mechanism that helps create a new block in a blockchain only after performing deduplication at destination.

Figure 4:
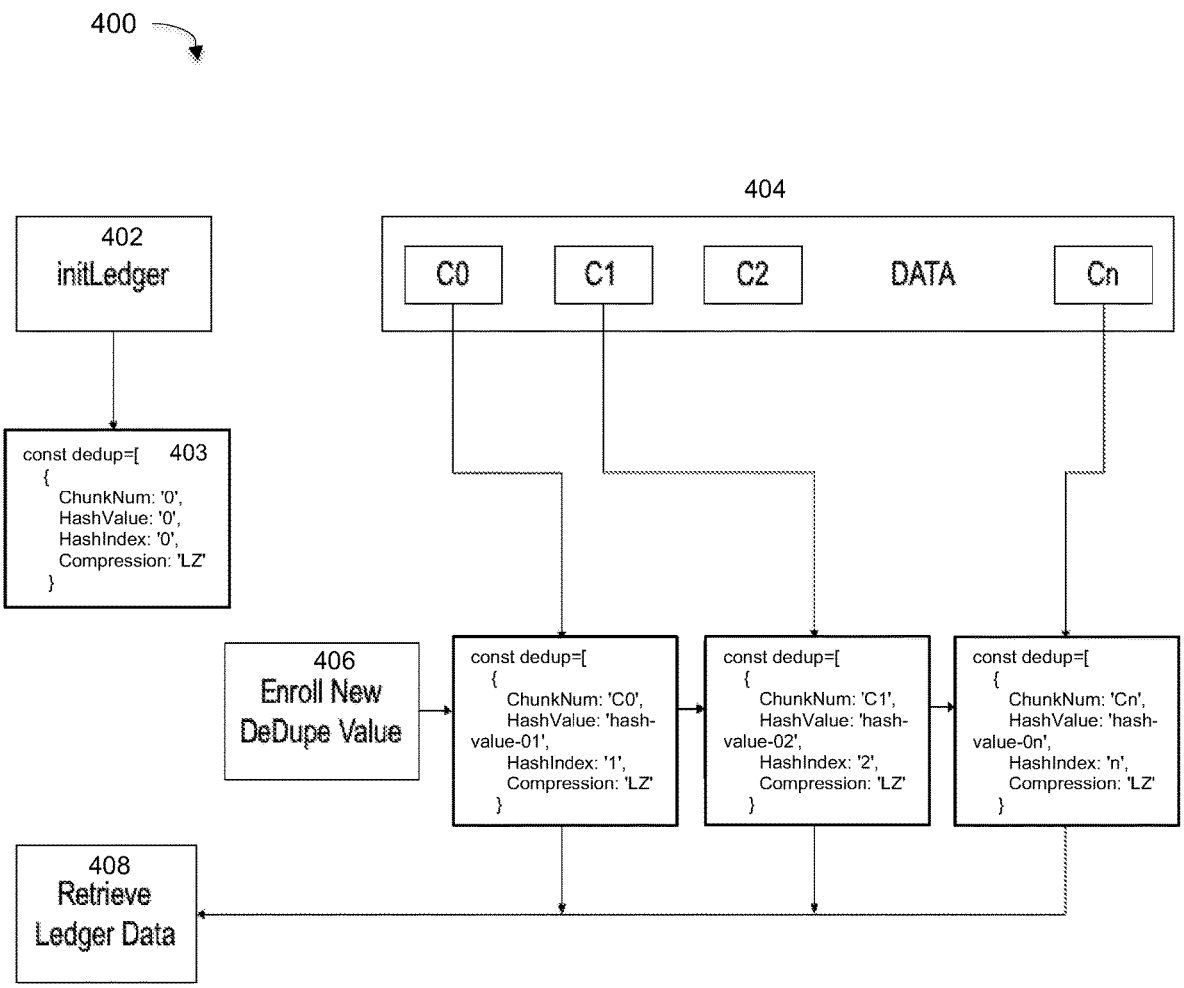
FIG. 4 is a combination block and flow diagram for implementing a smart contract for deduplication, under some embodiments.

FIG. 4 is a combination block and flow diagram for implementing a smart contract for deduplication, under some embodiments. The blockchain stores database data in the form of key-value pairs. Initially when the system loads a smart contract; the initial value of these key-value pairs is assigned. In the database these values are managed using put and push methods. As shown in diagram 400, the initial ledger (InitLedger) 402 comprises the data structure 403:

```
const dedup = [
    {
        ChunkNum: '0',
        HashValue: '0',
        HashIndex: '0',
        Compression: 'LZ'
    },
```

When the initial ledger 402 is started, the smart contract calls a put method, which will initialize the ledger with NULL values. EnrollNewDedupValues: As a file stream arrives to the deduplication system (e.g., Data Domain), the data 404 is divided into chunks, denoted C0, C1 to Cn. An enroll new deduplication values (EnrollNewDedupValues) process 406 captures the ChunkNum, HashValue, HashIndex and Compression values for each of the data chunks, Cx. These values will call a put method in the smart contract to push the data to a ledger database. For example:

```
const dedup = [
    {
        ChunkNum: 'C1',
        HashValue: '0x329474ssad',
        HashIndex: '1',
        Compression: 'LZ'
    }
Updated ledger value.
```

With respect to retrieving the ledger data, reconstruction of the actual ledger transaction is required to recreate the file. In that moment, a push smart contract function is used. The user can provide the chunk number (ChunkNum, Cx) as input to the smart contract function to get the block (chunk) information.

Figure 5:
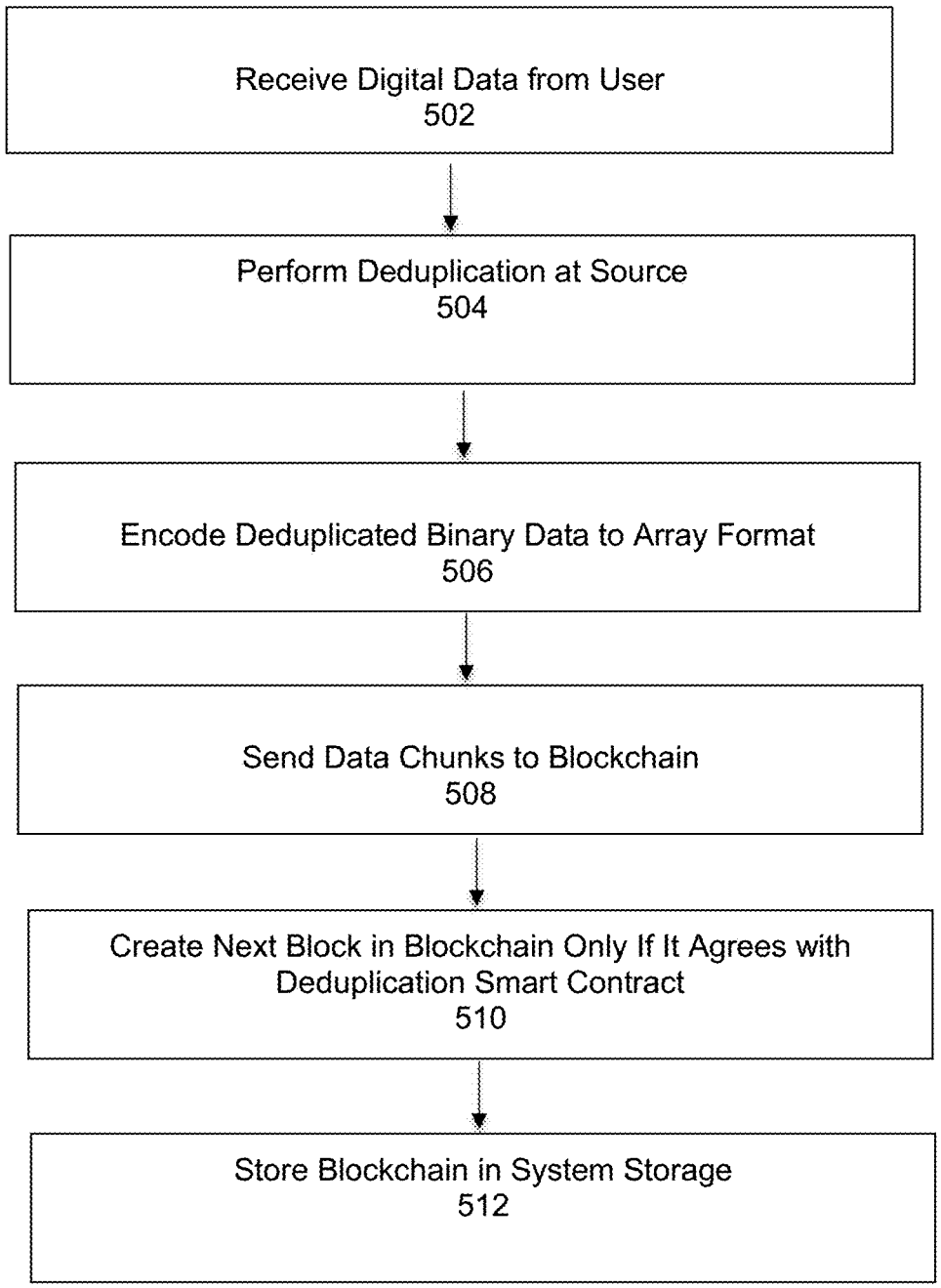
FIG. 5 is a flowchart illustrating a method of storing digital data using a blockchain for data deduplicated at the destination site, under some embodiments.

FIG. 5 is a flowchart illustrating a method of storing digital data using a blockchain deduplicated at the destination site, under some embodiments. The process of FIG. 5 can be performed for one or any number of users depending on the system configuration. FIG. 5 illustrates a process for a storage (write) path, and begins with the system receiving digital data from a user (such as in text, image, file, etc. form), 502. The source site deduplicates this data using deduplication process, such as Data Domain, 504. The system then encodes this deduplicated binary data to an array format (e.g., BAM), 506. The chunk size may be defined as any appropriate size, such as data chunk size <4 MB. Each data chunk is then sent to the blockchain network, 508. The next block in the blockchain is only created if it agrees with the deduplication smart contract, 510. All the deduplicated data is stored in the blockchain as "reference data," which is stored in system (e.g., HDD and/or SSD) storage.

Figure 6:
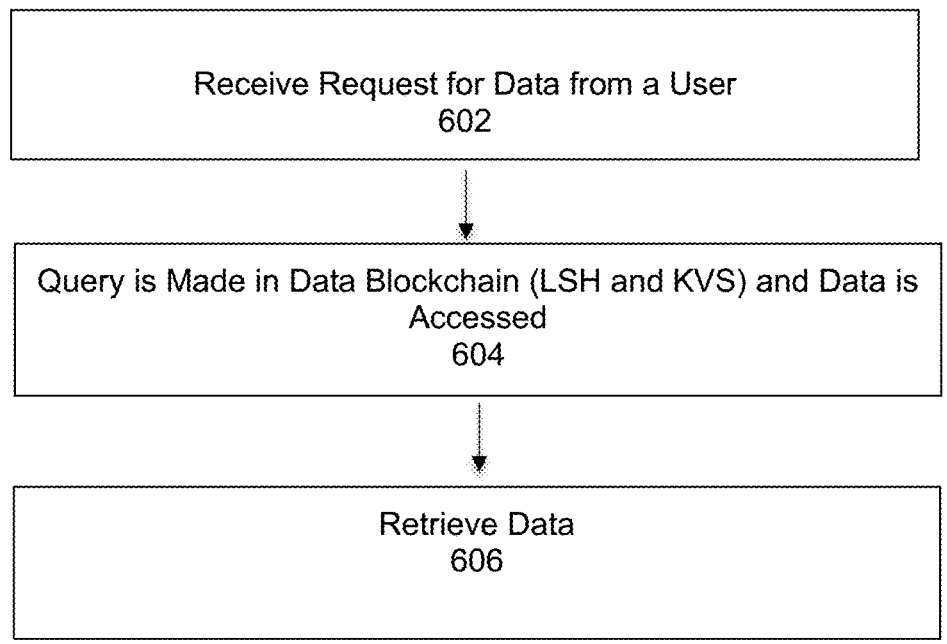
FIG. 6 is a flowchart illustrating a method of reading digital data using a blockchain for data deduplicated at the destination site, under some embodiments.

FIG. 6 is a flowchart illustrating a method of reading digital data using a blockchain for data deduplicated at the destination site, under some embodiments. FIG. 6 illustrates a process for a retrieval (read) path, and begins with the system receiving a user request for data, 602. A query (random read) is then made in the blockchain LSH and KVS and the appropriate data is accessed, 604, and the data is then retrieved (read), 606.

Figure 7:
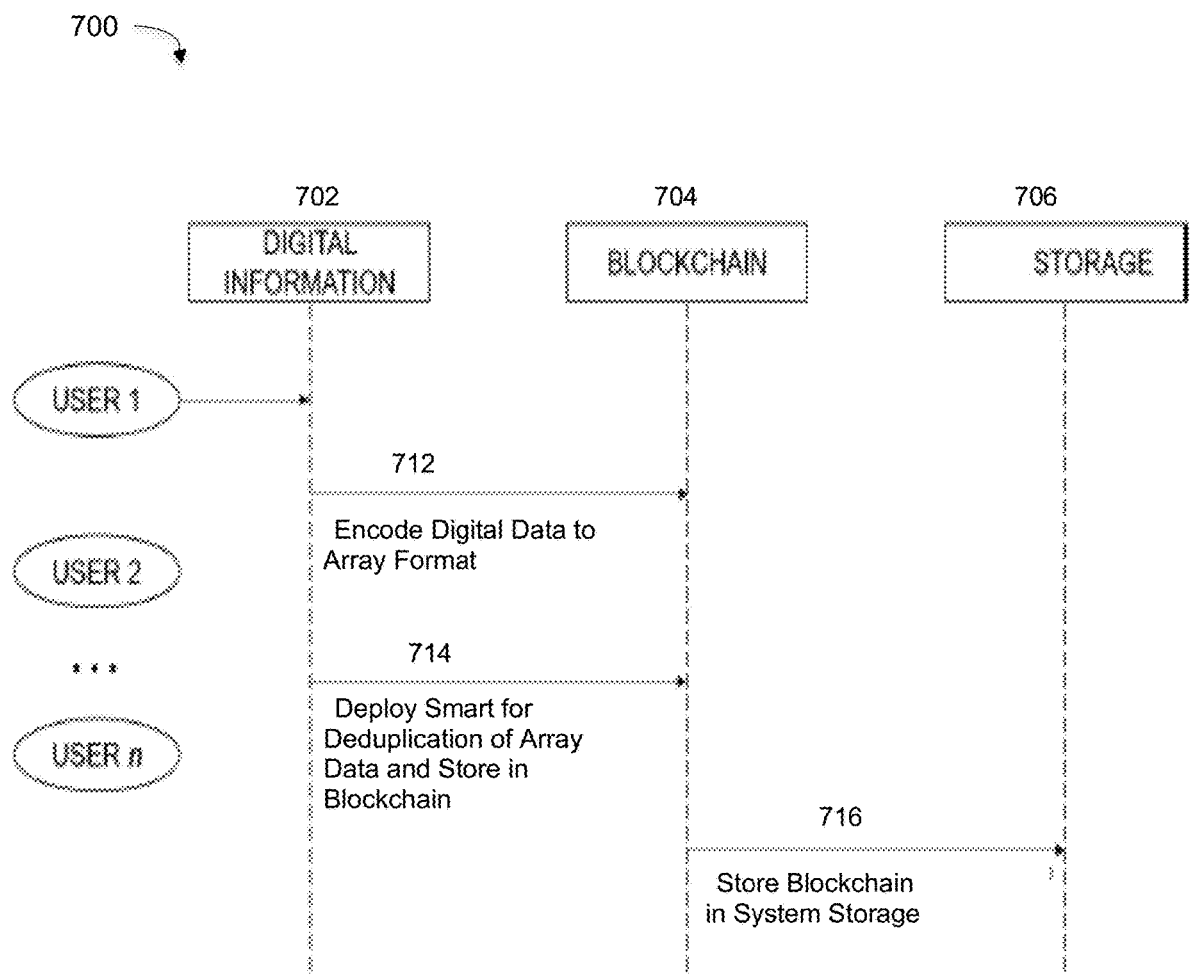
FIG. 7 is a sequence diagram illustrating storage of digital data using a blockchain, under some embodiments.

FIG. 7 is a sequence diagram illustrating storage of digital data using a blockchain, under some embodiments. As shown in diagram 700, a number of users (1 to n) can generate digital data 702. Regardless of the source data forma, digital data for a specific user is encoded to an appropriate array format, such as a .BAM file or similar and written to blockchain 704. A .BAM (Binary Aligned Map)

file is a binary version of a SAM file, which is a tab-delimited text file that contains sequence alignment data. Any similar or other appropriate file format may also be used. Process 700 also deploys a smart contract for deduplication of the array data and stores this as data in the blockchain 704. The blockchain data is then stored in system storage 706.

As shown in FIG. 7, the main process steps are encoding 712 the digital data to an appropriate format (e.g., .BAM file) for storage on blockchain 712; deploying a smart contract for deduplication and metadata storage, 714, and storing the blockchain in system storage, 716. Example details for each of these main processes will be provided below.

As shown in FIG. 7, each new incoming data element will be added to a new block of blockchain based on the smart contact which will deploy the logic of deduplication. In general, this process can involves processing millions of small files and creating hashes of these large number of files. The comparison operations are thus a performance and time bottleneck. Existing approaches like identify-based deduplication have their known disadvantages when dealing with this problem. For example, file-based deduplication is generally not effective as the process will return mostly unique sequences, block-based duplication (e.g., Rabin fingerprinting) does not yield much redundant data as distribution of sequences varies from each incoming nucleotide sequence, and application-aware deduplication using file structure and content does not help as metadata fields will mostly be unique.

Figure 8:
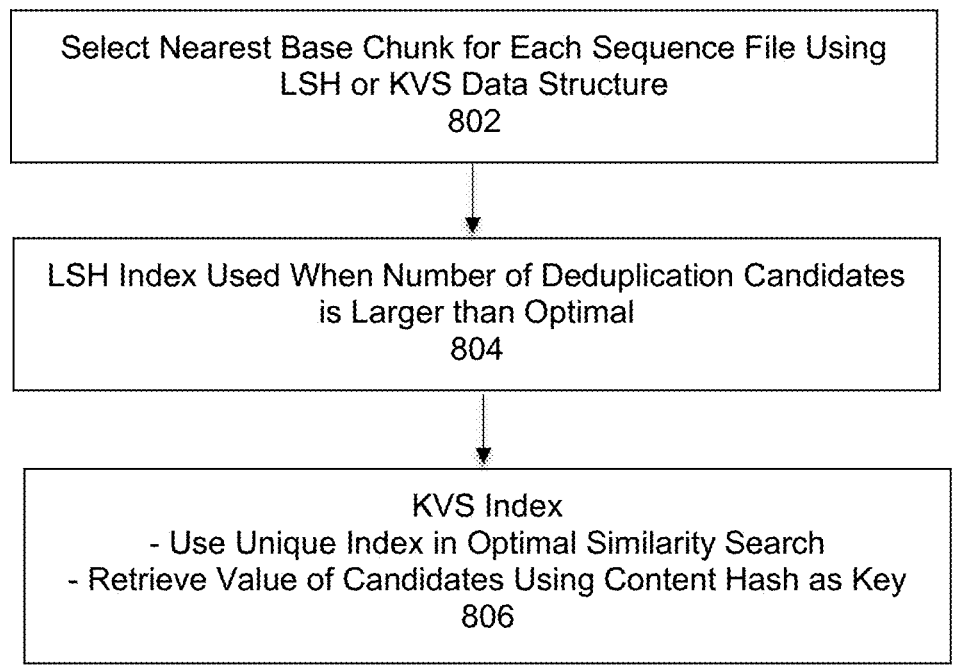
FIG. 8 is a flowchart illustrating a method of performing similarity-based deduplication, under some embodiments.

Embodiments use a hybrid approach of similarity-based deduplication with delta-encoding. This approach provides at least two advantages: first, it stores together a pointer to the most similar entry; and second, for a read operation a minimal list of modification is required for an original object from a current entry. FIG. 8 is a flowchart illustrating a method of performing similarity-based deduplication, under some embodiments. The first step 802 of the similarity-based deduplication process is to select the nearest base chunk for each sequence in .bam file using a selected data structure of either LSH or KVS. Using a Locality-Sensitive Hashing (LSH) index 804 enables a similarity search when the number of deduplication candidates is too large to efficient perform optimal searches, where a determination of efficient performance can be defined using defined thresholds for acceptable performance standards in a given deployment environment. For Key-value store (KVS) indexing, 806, the process uses unique entries in an optimal similarity search, and retrieves the value of candidates (deduplication) using their content hashes as keys. In general, KVS is tried first, and then LSH is tried if there are too many candidates to efficiently process. A data storage component is used to store the new block of blockchain.

Figure 9:
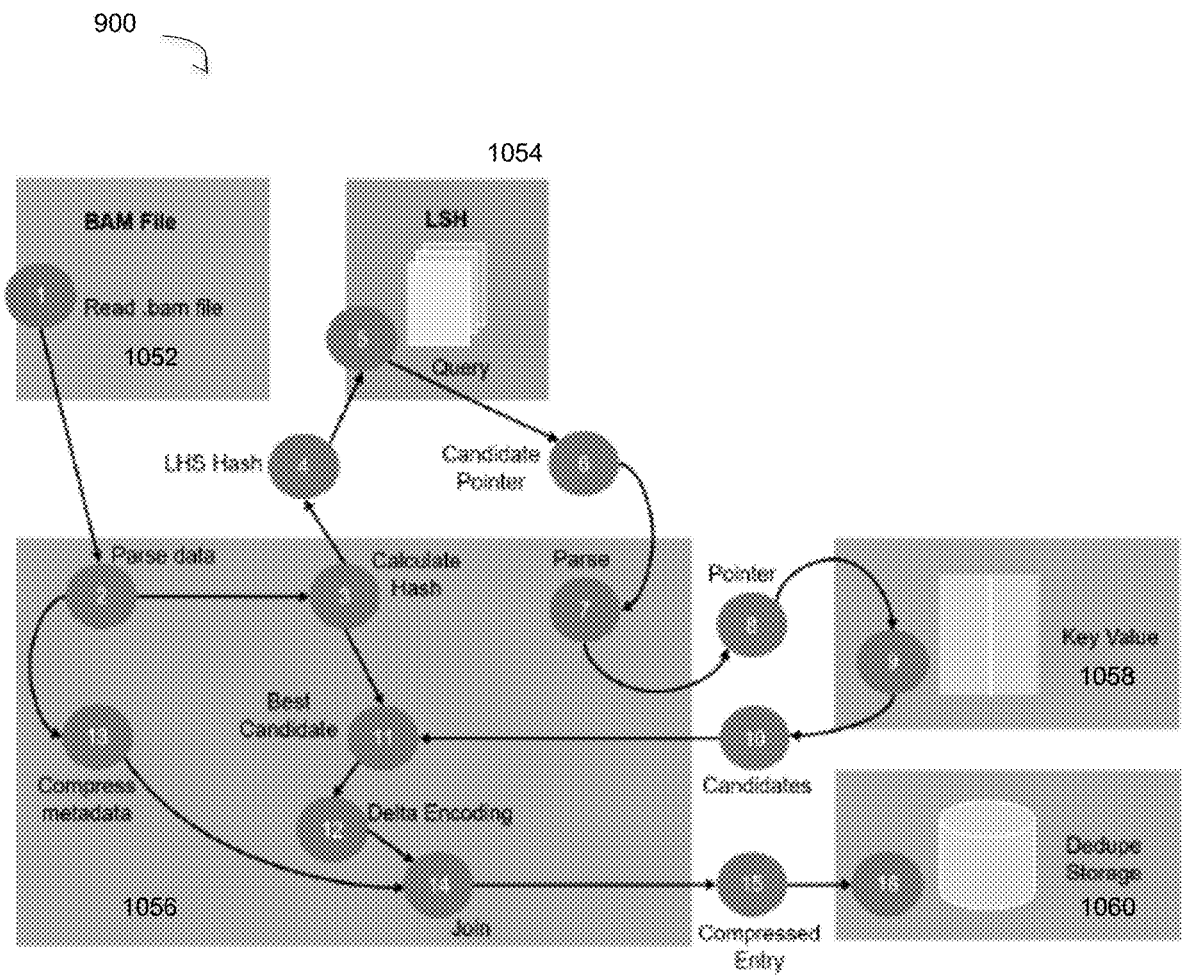
FIG. 9 is a combination block and flow diagram of a system and process for implementing a deduplication smart contract, under some embodiments.

FIG. 9 is a combination block and flow diagram of a system and process for implementing a deduplication smart contract, under some embodiments. As shown in FIG. 9, diagram 900 shows DNA data 1052 in the form of a .BAM file, a deduplication engine (processing unit) 1054, LSH 1056, a Key Value store 1058, and deduplication storage 1060. The process of FIG. 10 proceeds by (1) first reading input digital information transformed as nucleotides sequence in a .BAM file. This .BAM file is input to similarity-based deduplication engine 1056 and the process parses it (2) to calculate a hash value (3) and compress the metadata (13). The parsed data is nucleotide sequence for which the hash value (4) is calculated and which is sent to the LSH (Locality Sensitive Hashing) component 1054. The process then obtains the internal LSH key from these hashes (5). It does this by using a query respective LSH Hash index, and joining the list of pointers to candidates in a bigger list. The candidate pointer (6) is then returned to the deduplication component. Component 1056 receives a list of pointers to the candidate pointer (7). It then sends this pointer (8) to KVS 1058. The KVS obtains the candidate value using each pointer as a key (9), and returns a list of candidates (10). The deduplication engine 1056 calculates an edit distance between each candidate from received list (11). For this, an edit operation to delta encoding (e.g., Huffman encoding) is performed (12). The metadata is compressed (e.g., .BAM file header) (13), and this compressed metadata is joined with the delta encoded data (14) to form a compressed entry (15). This reduced (compressed) data is then sent to deduplication storage 1060 and written as entry to a new blockchain block.

Figure 10:
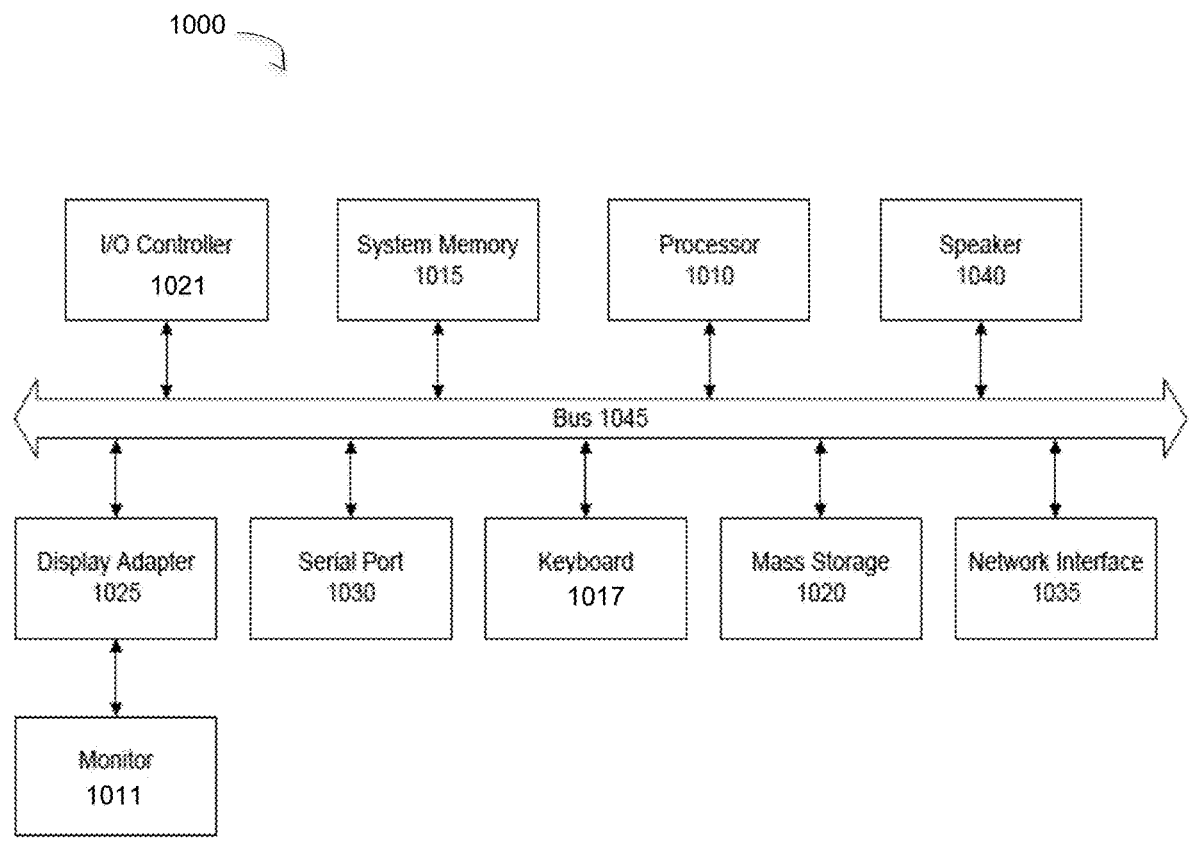
FIG. 10 is a block diagram of a computer system used to execute one or more software components of a deduplication system for blockchain data storage, under some embodiments.

FIG. 10 illustrates a sequence of steps that constitute a write operation. These process steps can be reversed to perform a read operation.

System Implementation

As described above, in an embodiment, system 100 includes a blockchain storage process 120 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing soft are code to perform the processing steps described herein. FIG. 10 is a block diagram of a computer system used to execute one or more software components of described herein. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of storing digital data on a blockchain comprising:
    receiving the digital data from a user;
    deduplicating the digital data in a hardware deduplication system to form deduplicated data, wherein the deduplication system executes a data compression process to store only unique data blocks by replacing redundant data blocks with pointers to unique data blocks copies, and further wherein as new data is written to a system, duplicate data chunks are replaced with pointer references to previously stored data;
    encoding, in a processor-based encoder, the deduplicated data into an array format for storage on the blockchain;
    deploying a smart contract for deduplication of an array comprising the deduplicated data to produce deduplicated array data;
    determining that the next block agrees with the smart contract; and
    storing the deduplicated array data as a next block in the blockchain.

2. The method of claim 1 wherein the deduplicated array data is formatted in a Binary Aligned Map (BAM) file format.

3. The method of claim 2 wherein the deduplication of the received digital data comprises a similarity-based deduplication process.

4. The method of claim 3 wherein the similarity-based deduplication process selects a nearest base chunk for each sequence in the BAM file using a locality-sensitive hashing (LSH) index and key-value store (KVS) indexing.

5. The method of claim 4 further comprising calculating a hash of the sequence data in the BAM file.

6. The method of claim 5 further comprising:
    sending the hash to the LSH;
    obtaining an internal LSH key from the hash;
    querying a respective LSH hash index; and
    joining a list of pointers to candidates in a bigger list.

7. The method of claim 6 wherein the KVS indexing uses unique entries in an optimal similarity search and retrieves values of candidates for deduplication using respective content hashes as keys.

8. The method of claim 7 further comprising calculating an edit distance between each candidate of the candidates using a delta encoding process.

9. The method of claim 8 further comprising:
    combining metadata with the data hashed by the LSH to form reduced data;
    sending the reduced data to the system storage; and writing an entry for the reduced data as the next block in the blockchain.

10. The method of claim 1 wherein the system storage comprises at least one of hard disk drive (HDD) storage, solid state device (SSD) storage, tape storage, or optical storage.

11. A method of constructing a unit of data for storage in a blockchain, comprising:
   parsing source data formatted in a Binary Aligned Map (BAM) file to create metadata and data;
   compressing, in a processor-based compressor, the metadata to produce compressed metadata;
   calculating a hash of the data using a locality-sensitive hashing (LSH) index to obtain a list of deduplication candidates of data chunks of the source data for the deduplication system;
   sending the list of deduplication candidates representing deduplicated nucleotide sequence data to the Key Value Store (KVS);
   deduplicating the data of the deduplication candidates to form the deduplicated nucleotide sequence in a hardware deduplication system by executing a data compression process to store only unique data blocks to replace redundant data blocks with pointers to unique data blocks copies, and wherein as new data is written to a system, duplicate data chunks are replaced with pointer references to previously stored data; and
   combining the compressed metadata and the deduplicated nucleotide sequence data to produce reduced data;
   deploying, for deduplication, a smart contract comprising the reduced data; and
   storing the reduced data in the blockchain.

12. The method of claim 11 further comprising:
   deploying the smart contract for destination-side deduplication of the reduced data; and
   storing the deduplicated reduced data in system storage;
   determining that the next block agrees with the smart contract; and
   writing an entry for the reduced data as a next block in the blockchain.

13. The method of claim 12 wherein the system storage comprises at least one of hard disk drive (HDD) storage, solid state device (SSD) storage, tape storage, or optical storage.

14. The method of claim 13 wherein the data comprises previously deduplicated data generated by a deduplication backup system.

15. The method of claim 12 wherein the block size of the next block in on the order of 4 MB or less.

* * * * *